US011927051B2

(12) United States Patent
Lee

(10) Patent No.: US 11,927,051 B2
(45) Date of Patent: Mar. 12, 2024

(54) GLAZING RETAINER FOR IMPACT RATED DOORS

(71) Applicant: OVERHEAD DOOR CORPORATION, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 37 days.

(21) Appl. No.: 17/720,051

(22) Filed: Apr. 13, 2022

(65) Prior Publication Data

US 2023/0332458 A1 Oct. 19, 2023

(51) Int. Cl.
*E06B 3/58* (2006.01)
*E06B 3/60* (2006.01)
*E06B 3/70* (2006.01)

(52) U.S. Cl.
CPC .......... *E06B 3/5821* (2013.01); *E06B 3/5814* (2013.01); *E06B 3/70* (2013.01); *E06B 3/60* (2013.01); *E06B 2003/7044* (2013.01)

(58) Field of Classification Search
CPC ........ E06B 3/58; E06B 3/5821; E06B 3/5828; E06B 3/5814; E06B 3/60; E06B 3/70; E06B 2003/7044
See application file for complete search history.

(56) References Cited

U.S. PATENT DOCUMENTS 2,374,056 A 4/1945 Watkins
3,016,993 A * 1/1962 Owen .................... E06B 3/5821 52/204.593
3,225,502 A * 12/1965 Hallauer .................... E06B 3/60 52/775
4,733,510 A 3/1988 Werner
4,897,975 A 2/1990 Artwick
5,189,862 A 3/1993 Lafleur
5,497,588 A 3/1996 Martin et al.
5,570,548 A 11/1996 Hopper
5,577,355 A 11/1996 Leonelli
6,151,849 A 11/2000 Twigg
6,318,037 B1 11/2001 Hansen
6,546,682 B1 4/2003 DeBlock
6,647,677 B1 11/2003 Berger
6,708,458 B1 3/2004 Berger, Jr.
6,715,245 B2 * 4/2004 Lewkowitz ........... E06B 3/5892 52/204.591
6,837,011 B2 1/2005 Berger
7,954,285 B2 6/2011 Taylor
8,201,367 B2 6/2012 Barnard et al.
8,479,462 B1 7/2013 Sahadeo
8,813,442 B1 8/2014 Edwards et al.
(Continued)

*Primary Examiner* — Christine T Cajilig
(74) *Attorney, Agent, or Firm* — Haynes and Boone, LLP

(57) ABSTRACT

A door includes a plurality of door panels hingedly connected. At least one of the plurality of panels includes a frame, a glazing member, and a retainer member. The frame defines an opening and includes a lip extending into the opening. A front side of the glazing member is disposed adjacent the lip. The retainer member is disposed adjacent a rear side of the glazing member. The retainer member includes a body member, a first leg, a second leg, a third leg, and a fourth leg. At least three of the first, second, third, and fourth legs are configured for receipt into corresponding channels in the frame to secure the retainer member to the frame.

23 Claims, 8 Drawing Sheets

(56) References Cited

U.S. PATENT DOCUMENTS

| | | | | |
|---|---|---|---|---|
| 9,022,091 | B2 | 5/2015 | Shives | |
| 10,829,983 | B2 * | 11/2020 | Haba | E06B 3/549 |
| 2003/0000164 | A1 | 1/2003 | Berger | |
| 2003/0066256 | A1 | 4/2003 | DeBlock | |
| 2005/0055906 | A1 | 3/2005 | Barnard | |
| 2007/0193140 | A1 | 8/2007 | Carnick | |
| 2007/0261326 | A1 | 11/2007 | Krochmal | |
| 2009/0241422 | A1 | 10/2009 | Mock et al. | |
| 2009/0277109 | A1 | 11/2009 | Taylor | |
| 2010/0287839 | A1 | 11/2010 | Barnard | |
| 2012/0055106 | A1 | 3/2012 | Phipps | |
| 2014/0262072 | A1 | 9/2014 | Shives | |
| 2017/0247937 | A1 * | 8/2017 | Haba | E06B 3/54 |
| 2018/0238102 | A1 | 8/2018 | Kornish | |
| 2019/0032393 | A1 * | 1/2019 | Shloznikov | E06B 3/5454 |
| 2020/0318422 | A1 * | 10/2020 | Koster | E06B 3/5864 |
| 2023/0220722 | A1 * | 7/2023 | Roesner | E06B 3/5892<br>52/204.62 |

* cited by examiner

GLAZING RETAINER FOR IMPACT RATED DOORS

TECHNICAL FIELD

This disclosure is generally directed to impact rated doors and windows. A glazing retainer described herein may be particularly suitable for multi-panel sectional doors.

BACKGROUND

Multi-panel doors of the type used for closing a large opening in a building, such as a garage door, have long been manufactured using a plurality of substantially identical panels. The plurality of panels may be pivotally connected together to permit relative hinging movement between adjacent panels when the door is moved between a vertical closed position and a horizontal open position.

Such multi-panel doors are commonly referred to as upward-acting sectional doors and often include panels formed of a shell or casing, such as a molded or stamped piece of metal, fiberglass, or plastic, and an insulating core. In some cases, a multi-panel door includes windows positioned within one or more of the panels to allow users to view through a portion of the door. Due to the lightweight shell and core used to form the panels, multi-panel doors often require cumbersome external framing structures to hold the windows in place within an opening formed into the panel. The windows and framing structures of such doors often provide for a limited viewing area through the door or may be prone to damage from wind and airborne debris in storm prone regions.

Impact rated glazing panels (made of glass, plastic, metal, wood, etc.) are capable of withstanding high impact loading in high-wind events (such as hurricanes, tornados, or other storms). These glazing panels generally require reinforcement to secure them to a door or window frame. Testing procedures for impact ratings of doors and windows generally include launching a 9-pound wooden 2"×4" missile at different velocities depending on the rating, typically in excess of 50 feet per second, at the door or window. The impact to a glazing panel for these impact ratings is violent and retaining the glazing panel in place within a door using conventional glazing retainers is challenging. In full view doors that are designed to maximize the ratio of glazing area versus frame area, conventional retainers may be insufficient to meet impact rating criteria. A conventional glazing retainer has two legs that are snapped into place in a frame member with protrusions engaging formations in the frame member and are often configured for ease of removal to allow servicing of the glazing panels. To meet impact rating criteria, conventional glazing retainers in full view doors often require a large quantity of fasteners, such as screws, to secure a retainer to the rails and stiles on the frame. Not only do these fasteners substantially increase the installation and assembly time of each panel, but they negatively affect the aesthetic appearance of the door.

Accordingly, a need exists for an improved door and window assembly to retain the aesthetics of a full view design and simplify assembly while satisfying impact rating criteria.

SUMMARY

The present disclosure is directed to door and window assemblies with glazing retainers that facilitate ease of assembly with a minimal quantity of fasteners while satisfying impact rating criteria. In particular, aluminum full view multi-panel sectional doors are described herein which utilize snap-in glazing retainers and require no fasteners, or relatively few fasteners, to withstand impacts to glazing panels without the glazing panels becoming dislodged.

Consistent with some examples, a door may include a plurality of door panels hingedly connected together. At least one of the plurality of door panels may include a frame, a glazing member, and a retainer member. The frame may define an opening and include a lip extending into the opening. A front side of the glazing member may be disposed adjacent the lip. The retainer member may be disposed adjacent a rear side of the glazing member. The retainer member may include a body member, a first leg, a second leg, a third leg, and a fourth leg. At least three of the first, second, third, and fourth legs may be configured for receipt into corresponding channels in the frame to secure the retainer member to the frame.

In some examples, a portion of the second leg may extend forward into a first channel in the frame and a portion of the third leg may extend rearward into a second channel in the frame. Aa portion of the fourth leg may extend rearward into a third channel in the frame. An adhesive member may be disposed between the lip of the frame and the front side of the glazing member. The frame may be formed of aluminum extrusions.

In some examples, the frame and retainer member may be configured such that, when a horizontal force is applied to the front side of the glazing member, the second leg is prevented from lifting away from the frame by a ridge of the frame extending above the second leg and at least one of the third leg or the fourth leg is prevented from translating rearward by engagement with corresponding protrusions on the frame.

In some examples, the first leg may extend substantially vertically and may be configured to contact the rear side of the glazing member.

In some examples, a portion of each of the first and second legs may extend forward into corresponding first and second channels in the frame and a portion of each of the third and fourth legs may extend rearward into corresponding third and fourth channels in the frame.

In some examples, the frame may include a ledge substantially perpendicular to the lip. An outer perimeter of the glazing member may be configured to contact the ledge. A resilient seal member may be disposed between the retainer member and the rear side of the glazing member.

Consistent with some examples, a retainer member configured to retain a glazing member in a door or window may include a body member, a first leg, a second leg, a third leg, and a fourth leg. The second leg may be configured to engage a first mating feature of a frame of the door or window, the third leg may be configured to engage a second mating feature of the frame, and the fourth leg may be configured to engage a third mating feature of the frame. Each of the second, third, and fourth legs are configured to flex with respect to the body member.

In some examples, a front side of each of the first leg and the second leg may be configured to engage the frame and a rear side of each of the third leg and the fourth leg may be configured to engage the frame. A retainer member may include a first vertical member from which the first and second legs extend, a second vertical member from which the third leg extends, and a third vertical member from which the fourth leg extends. Each of the first, second, and third vertical members may extend from the body member. At least a portion of the first vertical member may be cylindrical forming a cavity configured to retain a seal member. A retainer member may include a horizontal member extending between the first leg and the second leg. A portion of the body member and a portion of the horizontal member may form a cavity configured to retain a seal member.

In some examples, the first vertical member and the horizontal member form an L-shaped recess configured to receive an edge of a glazing member.

In some examples, a retainer member may include a first vertical member from which the first leg extends, a second vertical member from which the second leg extends, a third vertical member from which the third leg extends, and a fourth vertical member from which the fourth leg extends. Each of the first, second, third, and fourth vertical members may extend from the body member. The fourth vertical member may be shorter than the second vertical member. A portion of the body member may be angled away from the first, second, third, and fourth legs between the fourth leg and the second leg. A retainer member may include a horizontal member extending between the first and second vertical members. The body member may have a deformation region configured to collapse and absorb impact energy.

In some examples, the second leg may include a first set of teeth and the third leg may include a second set of teeth. The first and second sets of teeth may be configured to receive corresponding threads of a fastener.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any example or aspect may be combinable with one or more features of other example or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
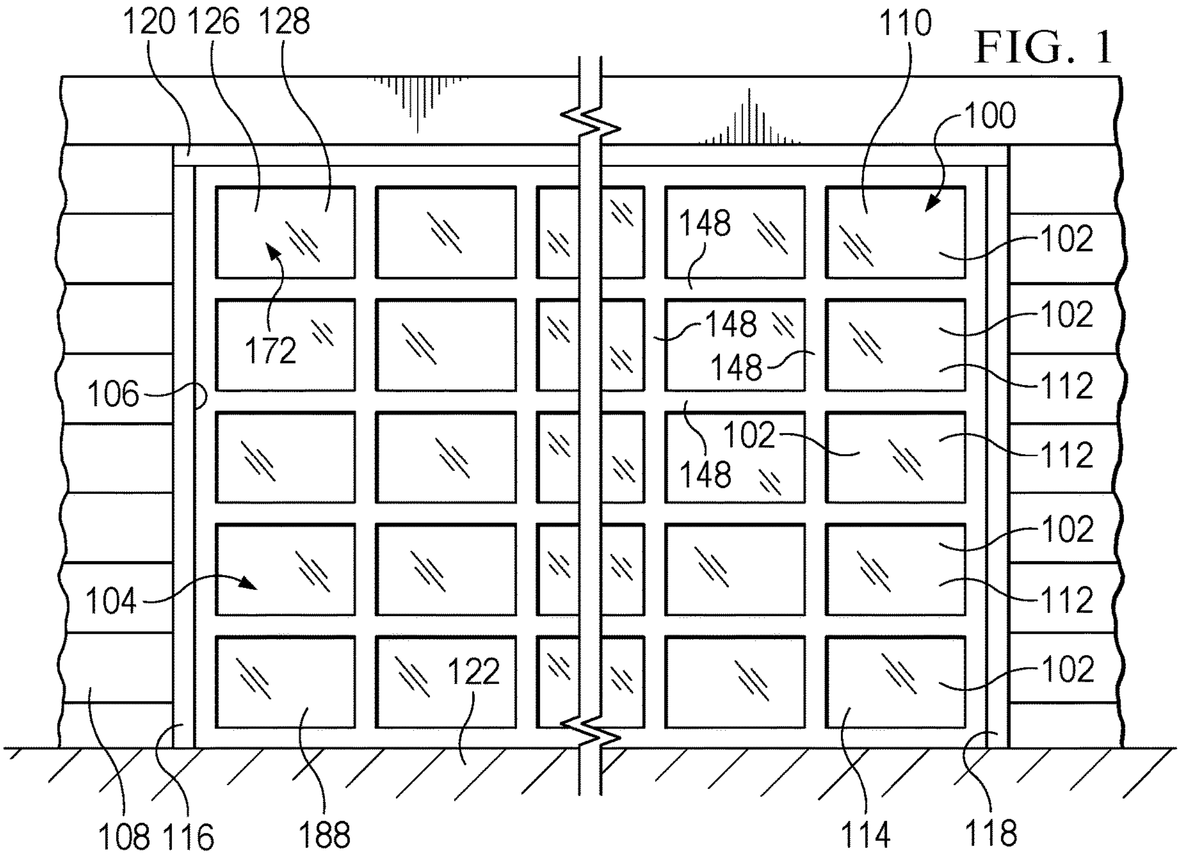
FIG. 1 is a front view of an example of a multi-panel door in accordance with the present disclosure.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more example implementations or figures although those same elements or features may appear in other example implementations or figures without such a high level of detail. It is fully contemplated that the features, components, and/or steps described with respect to one or more example implementations or figures may be combined with the features, components, and/or steps described with respect to other example implementations or figures of the present disclosure. For simplicity, in some instances the same or similar reference numbers are used throughout the drawings to refer to the same or like parts.

The present disclosure is directed to door systems and methods of manufacture and assembly. The systems and methods described herein may provide for multi-panel sectional doors that satisfy impact rating criteria for storm prone regions. The concepts of the present disclosure may be suited for aluminum full view doors in which a majority of the exposed front surface and/or rear surface of the door is transparent or translucent by providing for a low-profile glazing retainer that securely snaps into place in a frame rail or stile.

FIG. 1 illustrates an example of an upward-acting multi-panel door 100 rated for hurricane and other storm areas such that the door 100 is impact resistant, while still providing a full view through the door 100. The door 100 includes a plurality of panels 102 that together form a front face 104 and enclose an opening 106 in a building 108 or other structure. In the example illustrated in FIG. 1, the plurality of panels 102 includes a top panel 110, several intermediate panels 112, and a bottom panel 114, all interconnected by hinges to cover an opening 106 defined by two jambs 116, 118, a header 120, and a floor 122 (e.g., a driveway). In other examples, the door 100 may include any number of panels 102 and may be located in any suitable opening 106. For example, the door 100 may include the top panel 110, one intermediate panel 112 and the bottom panel 114. The panels 102 may be hingedly connected and mounted on conventional track and rollers (not shown) within a structure to enable movement of the door 100 between the vertical (closed) position shown in FIG. 1, and a horizontal (e.g., open or overhead) position.

Figure 2:
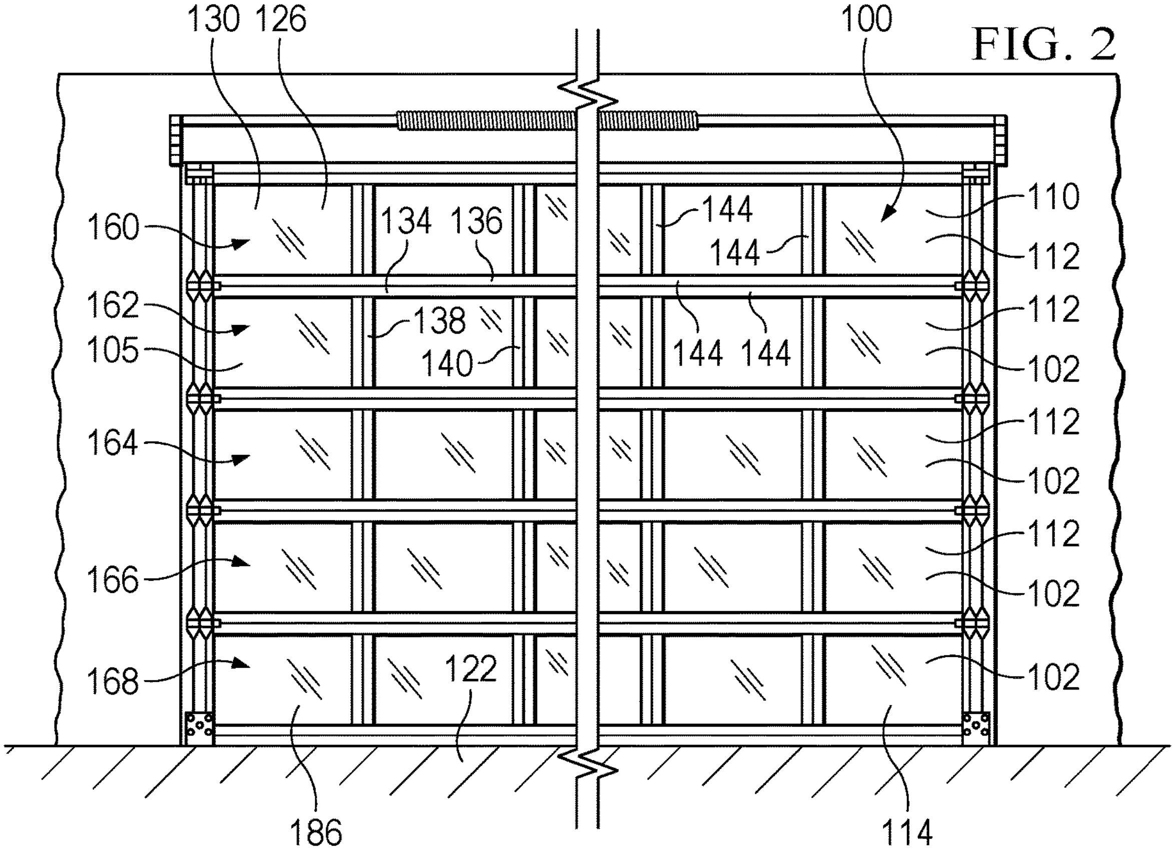
FIG. 2 is a rear view of the example of a multi-panel door of FIG. 1.
Figure 3:
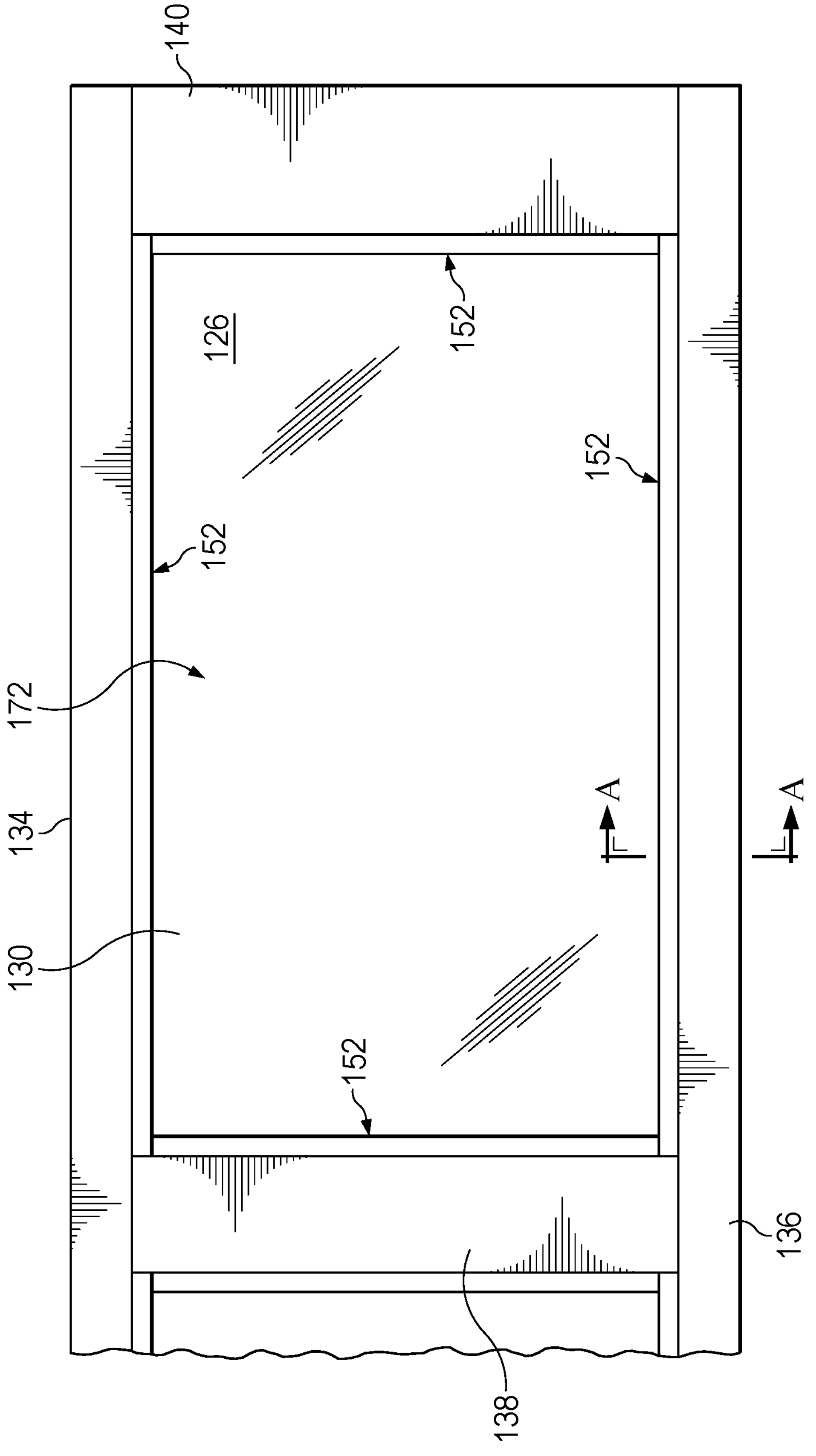
FIG. 3 is a rear view of a portion of a panel of the multi-panel door of FIG. 2.

Referring to FIGS. 1-3, each of the panels 102 is comprised of one or more interconnected frames 160, 162, 164, 166, 168. The panels 102 further include one or more sheets of material or glazing members 126 positioned within the frames 160, 162, 164, 166, 168 and retainer members 152 to hold the glazing members 126 within the frames. The glazing members 126 each have an outer surface 128 and an inner surface 130. In some examples, the top panel 110 includes a plurality of frames 160, the intermediate panels 112 include a plurality of frames 162, 164, 166, and the bottom panel 114 includes a plurality of frames 168. Thus, a plurality of frames 160 form the framing for the top panel 110, a plurality of frames 162, 164 and 166 form the framing for the intermediate panels 112, respectively, and a plurality of frames 168 form the framing for the bottom panel 114. In some examples, each of the panels 102 is formed of a single frame extending the width of the door 100. Each of the frames 160, 162, 164, 166, 168 includes an inward facing surface 186 and an outward facing surface 188. The inward facing surface 186 faces an interior portion of the space enclosed by the door 100, such as the interior portion of a garage. The outward facing surface 188 faces an exterior or away from the space enclosed by the door 100.

Each of the panel frames 160, 162, 164, 166, 168 is formed of an upper frame member 134 and a lower frame member 136 (or "rails") as well as a first side member 138 and a second side member 140 (or "stiles"), collectively frame members 139. The frame members 139 are coupled together to form the panel frames 160, 162, 164, 166, 168 or a portion of the panel frames. In some examples, the frame members 139 are formed as aluminum extrusions that are coupled together to form an opening 172. It should be appreciated that other metals or other materials (e.g., plastics) can be used to construct the frame members. In some examples, all of the frame members have the same cross-sectional profile shape and may be formed a common segment of extruded material cut to size. In such examples, the intermediate frame members (such as side member 138) may comprise two segments arranged back-to-back to define a portion of two adjacent openings 172. In some examples, the intermediate frame members may have a different cross-sectional shape than the outer frame members. In the illustrated example, the frame members 139 form a rectangular opening 172, but it should further be appreciated that other suitable shapes may be utilized in other examples.

Each of the frame members 139 includes an inner surface 144 that faces an interior portion of the space enclosed by the door 100, such as the interior portion of a garage, and an outer surface 148 that faces an exterior or away from the space enclosed by the door 100. In some examples, the inner and outer surfaces 144, 148 of the frame members 139 are substantially co-planar when the door 100 is in the closed position.

Figure 4A:
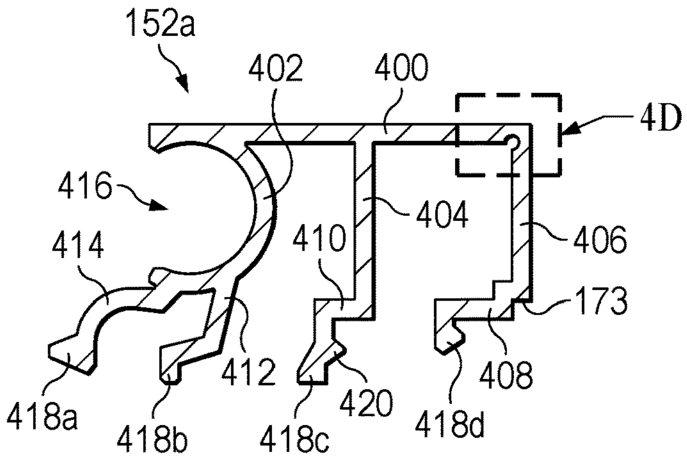
FIG. 4A is a cross-section view of a portion of an example of a retainer member in accordance with the present disclosure.

FIG. 4A illustrates an example of a retainer member 152*a* which may be similar to or the same as retainer members 152 shown in FIG. 3. Retainer member 152*a* may be positioned within an opening 172 and adjacent to the inner surface 144 (or "rear side") of a respective glazing member 126. The retainer member includes a body member 400, which in some examples is horizontal when installed and the door is in the closed position. A front vertical member 402 extends from the body member 400 near a front side of the retainer member 152*a*. A rear vertical member 406 extends from the body member 400 near a rear side of the body member 400. An intermediate vertical member 404 extends from the body member 400 between the front and rear vertical members 402, 406. In the illustrated examples, the body member extends horizontally with a flat continuous surface on one side. The vertical members 404, 406 are perpendicular to a flat surface on the other side of the body member 400. The vertical member 402 extends rearward at an angle from the same side of the body member 400 as the vertical members 404, 406 and is curved toward a front side of the retainer member 152*a*, forming a cylindrical channel 416. It should be appreciated that "vertical" as used in describing vertical members herein may refer to a direction other than horizontal, that is "vertical" may refer to a direction extending generally upward or downward from the body member 400 in the illustration of FIG. 4A and not necessarily perpendicular to the orientation of the body member 400.

A front leg 414 with a forward extending curve forms a portion of the front vertical member 402 and includes a first foot 418*a*. In this regard, "foot" may refer to a distal extension or widening of a respective leg forming a protruding region. An intermediate leg 412 with a rearward extending bend forms a portion of the front vertical member 402 proximal of the front leg 414 and includes a second foot 418*b* extending generally away from the body member 400. An intermediate leg 410 with a horizontal portion and a vertical portion forms a portion of the intermediate vertical member 404 and includes a third foot 418*c*. A heel 420 extends rearward from the intermediate leg 410. A rear leg 408 with a horizontal portion and a vertical portion forms a portion of the rear vertical member 406 and includes a fourth foot 418*d*.

Figure 4D:
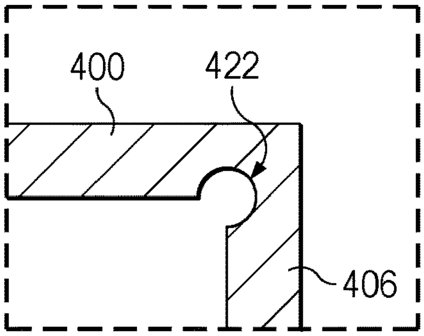
FIG. 4D is an enlarged view of a portion of the retainer member of FIG. 4A.

In some examples, the retainer member 152*a* is formed as a continuous extrusion of a material, such as aluminum, such that the cross-sectional profile of the retainer member 152*a* shown in FIG. 4A extends along the length of the retainer member 152*a*. In this regard, each vertical member, leg, and/or foot may effectively form a fin extending from the body member 400. The material used in constructing the retainer member 152*a* may have sufficient stiffness to secure a glazing member, withstand loading, and sufficiently interlock with other components to secure the glazing member, while at the same time provide for flexibility and elastic bending between the body member 400 and each vertical member 402, 404, 406, between each vertical member and the respective legs 408, 410, 412, 414, and between each leg and the respective foot 418*a*-418*d* in manner that snaps or interlocks with a frame member 139. In this regard, each of the legs 408, 410, 412, 414 is semirigid, meaning the retainer member 152*a* has sufficient elastic flexibility to allow the legs to move toward or away from one another during installation but is sufficiently rigid to remain engaged with the frame member 139 during wind and/or impact loading. As shown in FIG. 4D, a notch 422 may be formed at an intersection of the body member 400 and the rear vertical member 406. The notch 422 reduces a cross sectional thickness of the retainer member 152*a*, thereby reducing resistance to bending and increasing flexibility. In some examples, additional notches may be formed in other regions of the retainer member 152*a* to increase flexibility as desired.

A reveal 173 is formed along the lower rear edge of the retainer member 152*a*. The reveal 173 may be configured to receive the tip of a pry bar, screwdriver, or other tool to pry the retainer member 152*a* away from the frame member 139 during disassembly to service the glazing member.

It should be appreciated that the illustrated retainer member 152*a* is provided as an example of a retainer member 152 of FIG. 3 and any number of changes to the geometry of the retainer member 152*a* may be made without departing from the scope of this disclosure. For example, more or less vertical members, legs, feet, etc. could be provided, intersecting features could be oriented at different angles or curves instead of angles, the spacing between features could be altered, etc. Additional examples of retainer members (collectively "retainer members 152") that may be interchangeable with retainer member 152*a* are discussed further below with reference to FIGS. 6A-9B. It should be appreciated that features and functionalities of the retainer member 152*a* are similarly applicable to retainer members 152*b*-152*e*. For example, any of the retainer members 152 described herein may include a reveal 173, a cylindrical seal cavity 416, one or more notches 422, a horizontal body member, etc.

Figure 4B:
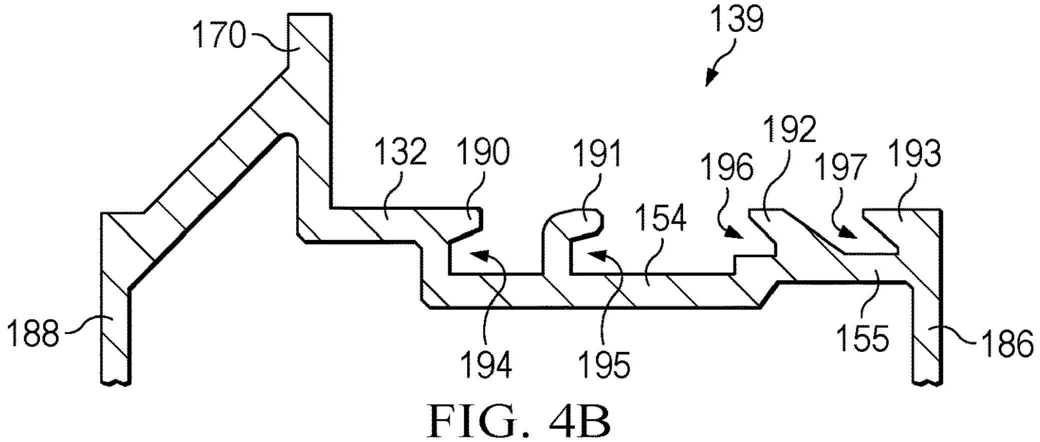
FIG. 4B is a cross-section view of a portion of an example of a panel frame member.

Turning to FIG. 4B, an example of a frame member 139 is illustrated. The retainer member 152*a* of FIG. 4A may be configured for engagement with the frame member 139. Frame member 139 of FIG. 4B may be representative of all or any of frame members 134, 136, 138, 140 of FIG. 3. Frame member 139 has an inward facing surface 186 ("rear surface") and an outward facing surface 188 ("front surface"). A ledge 132 extends at least partially between the front and rear surfaces of the frame member 139. A lip 170 is recessed behind the front surface 188 and extends perpendicular to the ledge 132 forming an L-shaped recess configured to receive an edge of a glazing member 126. The lip 170 may form a barrier that the glazing member rests against or is secured to in order to retain the glazing member 126 in the opening 172. The lip 170 may have a low-profile, extending into the opening 172 only a short distance, providing each frame member 139 a low-profile such that the glazing members 126 are substantially unobstructed by the frame members. In some examples, the low-profile of the frame members 139 around the glazing members 126 give the door 100 a substantially full view when the door 100 is in the closed position, as will be described in more detail below. A majority of the outer surface 128 of the glazing members 126 may be unobstructed by the frame members 129 and the retainer member 152*a* so that the door 100 has a principally transparent or translucent appearance when the glazing members 126 are made of a transparent or translucent material. In some examples, more than fifty percent, more than sixty percent, or more than seventy percent of outer surfaces 128 of the glazing members 126 may be unobstructed.

In some examples, the lip 170 may be an extension of the front surface 188 rather than being recessed behind the front surface 188. When assembled in a door, the lip 170 of the frame member 139 extends into an opening 172. The ledge 132 may be configured to at least partially support the weight of a glazing member 126. In other examples, a gap may be present between the ledge 132 and a corresponding glazing member 126. It should be appreciated that since each of the upper frame member, lower frame member, and side members may include the ledge 132, one or more of the respective ledges 132 may at least partially support the weight of the glazing member 126 (e.g., the lower frame member) while a gap may exist between the glazing member 126 and the ledge 132 of one or more other frame members 139 (e.g., the side members and/or the upper frame member).

The frame member 139 further includes a horizontal member 155 extending forward from the rear surface 186. The horizontal member 155 is illustrated as being perpendicular to the rear surface 186 but may be angled with respect thereto in some examples. The horizontal member extends at least partially between the rear surface 186 and the front surface 188. The frame member 139 further includes a shoulder 154 positioned below and between the horizontal member 155 and the ledge 132. The shoulder 154 may be perpendicular to the rear and/or front surfaces 186, 188. The shoulder 154 is illustrated as being parallel to the ledge 132 but other suitable configurations are possible in which the shoulder 154 is angled relative to the ledge 132.

The shoulder 154 and horizontal member 155 are configured to support the retainer member 152*a*. To couple the retainer member 152*a* to the frame member 139, a number of mating features are provided on the frame member 139 to matingly engage respective legs and/or feet of the retainer member 152*a*. In the illustrated example, a protrusion 190 extends rearward from the ledge 132 over a front portion of the shoulder 154. A protrusion 191 extends upward from a portion of the shoulder 154 and is bent rearward to form a ridge rearward of the protrusion 190. A protrusion 192 extends upward at a forward angle from the horizontal member 155 and a protrusion 193 extends upward and at a forward angle from a rear portion of the horizontal member 155. The protrusion 190 and the shoulder 154 form a channel 194 and the protrusion 191 and the shoulder 154 form a channel 195. The protrusion 192 and the horizontal member 155 form a channel 196 and the protrusion 193 and the horizontal member 155 form a channel 197. The forward channels 194, 195 each open in a generally rearward direction and the rear channels 196, 197 each open in a generally forward direction.

It should be appreciated that the illustrated frame member 139 is provided as an example and any number of changes to the geometry of the frame member 139 may be made without departing from the scope of this disclosure. For example, more or less protrusions or channels could be formed, intersecting features could be oriented at different angles, the shoulder 154 could be offset a greater or shorter distance from the ledge 132, etc.

Figure 4C:
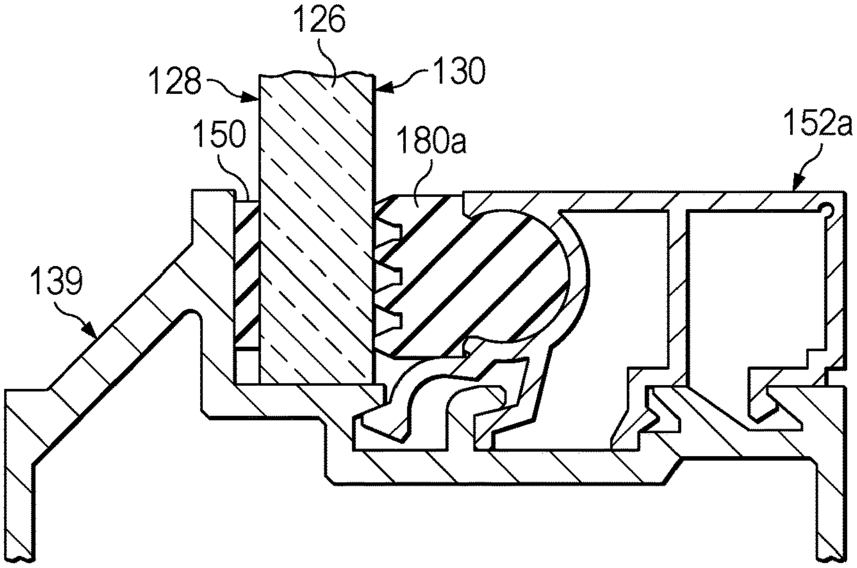
FIG. 4C is a cross-section view of an assembled panel including the retainer member of FIG. 4A and the panel frame member of FIG. 4B, taken along line A-A in FIG. 3.

FIG. 4C illustrates a cross-section through a lower frame member 136 of an assembled panel including the retainer member of FIG. 4A and the panel frame member of FIG. 4B, taken along line A-A shown in FIG. 3. During assembly, the frame members 139 may be connected together to form a panel frame with an upper frame member 134, lower frame member, and a first side member 138 and a second side member 140 extending between the upper and lower frame members. A coupling mechanism 150 may be placed on the rear side of the lip 170 of each of the frame members 139, or around a rim of the outer surface 128 of the glazing member 126. In some examples, the coupling mechanism 150 is a layer of adhesive (such as Adseal 4549 silicone based adhesive made by AdChem Corporation of Riverhead, New York), double-sided tape (such as 4991 VHB tape made by 3M Company of Maplewood, Minnesota), butyl sealant tape, or some other coupling material suitable to aid in retaining the glazing member 126 in the opening 172. The coupling mechanism 150 may also form a seal between the glazing member 126 and panel frame.

Next, the glazing member 126 may be installed into the panel frame. For example, the bottom edge of the glazing member 126 may be placed on the ledge 132 of the lower frame member and tilted into place against the lips 170 of the upper frame member and side frame members. The coupling mechanism 150 may help temporarily retain the glazing member 126 in place while retainer members 152*a* are installed onto one or more of the lower frame member, upper frame member, or side members as described below in relation to FIGS. 5A-5C.

Each glazing member 126 may be made of any suitable material and may be opaque, translucent, semi-translucent, transparent, semi-transparent or a combination of any of the foregoing. For example, in some examples the glazing members 126 are made of semi-translucent black, white, bronze or mirror silver glass. In other examples, the glazing members 126 are made of an opaque metal material. In yet other examples, the glazing members 126 are made of tempered glass that has flame-polished edges to prevent chipping or cracking. In some examples, the glazing members 126 are made of polycarbonate. In some examples, the glazing members 126 are rated for use in hurricane prone areas, such as the state of Florida in the United States of America, so that the glazing members 126 are capable of withstanding high wind loads and missile impact from debris. Moreover, the glazing members 126 may meet the rating standards set by state or governmental entities in said hurricane prone areas.

The glazing members 126 may have any suitable thickness. In some examples, the thickness of the glazing members 126 is ⅛ inch, ¼ inch, or ½ inch, although thinner and thicker glazing members 126 are contemplated. The thickness of the glazing members 126 may be equal to, less than, or greater than the thickness of the ledge 132. In one example, the thickness of the glazing members 126 is equal to the thickness of the ledge 132. In another example, the thickness of the glazing members 126 is less than the thickness of the ledge 132.

The glazing members 126 generally have a height and width that are substantially equal to the height and width of the opening 172 formed in the panel frames 160, 162, 164, 166, 168. In other examples, multiple glazing members 126 are positioned in the opening 172 and fitted against or otherwise coupled to each of the panel frames such that the glazing members 126 have a combined height and width that is substantially equal to the height and width of the opening 172 formed by the panel frames. In one example, the glazing members 126 are individually or otherwise combined to be 23 inches high by 50 inches wide. The height and width of the glazing members 126 will generally depend on the size of the opening 172 formed by the panel frames 160, 162, 164, 166, 168.

When a retainer member 152*a* is installed, as shown in FIG. 4C, a seal 180*a* secured to the retainer member may be in compression against the inner surface 130 of the glazing member 126, urging the glazing member 126 forward against the lip 170 and/or coupling mechanism 150, if present. In the installed configuration, the feet 418*a*-418*d* of the retainer member 152*a* are disposed in respective channels 194-197 of the frame member 139. One or more of the legs 408, 410, 412, and 414 may be in a flexed configuration, biasing a respective foot 418*a*-418*d* into a respective channel 194-197. That is, the spacing between the feet 418*a*-418*d* in a relaxed configuration (uninstalled) of the retainer member 152*a* may be different than the spacing between the feet in the installed configuration due to the positioning and spacing of the of the protrusions 190-193. This biasing of the feet 418*a*-418*d* may help retain the feet in the corresponding channels 194-197.

A horizontal force caused by wind or impact against the outer surface 128 of the glazing member 126 will tend to push the glazing member 126 rearward. The retainer member 152*a* may resist movement of the glazing member 126 in response to such a force. For example, the engagement of the feet 418*c* and 418*d* with the horizontal member 155 and rear protrusion 192, respectively, will prevent the retainer member 152*a* from translating rearward. The flexibility of the vertical members 404, 406 and legs 408, 410 may also allow the retainer member 152*a* to absorb energy from impact by debris. The seal 180*a*, which may be formed of a resilient material such as rubber, may also aid in absorbing impact energy.

Further, the engagement of the rear leg 408 with the protrusion 193 may tend to form a fulcrum or pivot point of the retainer member 152*a* with respect to the frame member 139 at the forward-extending point of the rear protrusion 193 in response to a wind or impact force acting against the outer surface 128 of the glazing member 126. One or more of the protrusions 190-193 may help counter this tendency of the retainer member 152*a* to pivot or rotate out of the installed configuration. For example, rotation of the retainer member 152*a* will tend to lift the front leg 414 upward away from the shoulder 154 but the protrusion 190 will interfere with the foot 418*a*, thereby resisting such movement. Similarly, the leg 412 will tend to lift away from the shoulder 154 but the ridge formed by the protrusion 191 will interfere with the foot 418*b*, thereby resisting such movement. Similarly, the leg 410 will tend to lift away from the shoulder 154 and/or the horizontal member 155 but the protrusion 192 will interfere with the heel 420, thereby resisting such movement. Additionally, pivoting of the retainer member 152*a* is resisted by the horizontal component of the rear leg 408 resting on the top surface of the rear protrusion 193. Accordingly, the one or more retainer members 152*a* in a panel frame may securely retain the glazing member 126 even in high-wind storm events allowing the door 100 to satisfy impact-rating criteria, for example, those of American Society of Testing and Materials (ASTM) E1996.

Figure 5A:
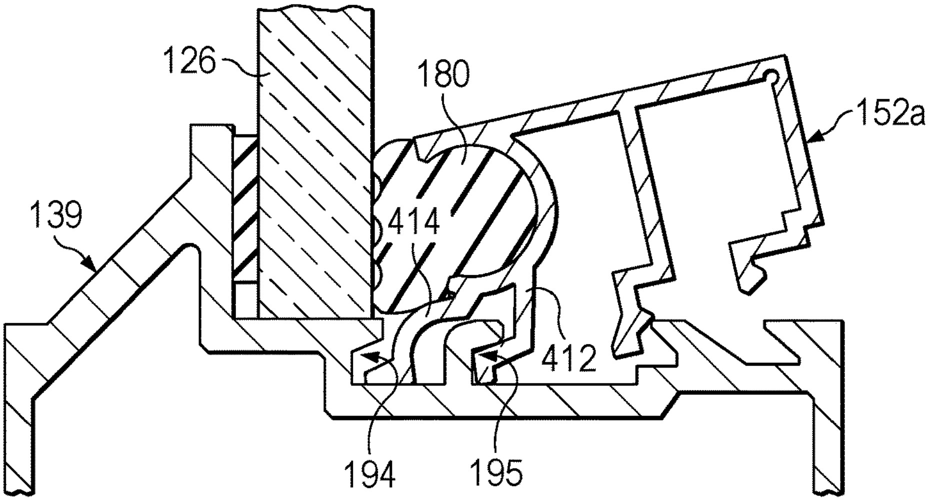
FIGS. 5A-5C illustrate assembly of the panel of FIG. 4C.
Figure 5B:
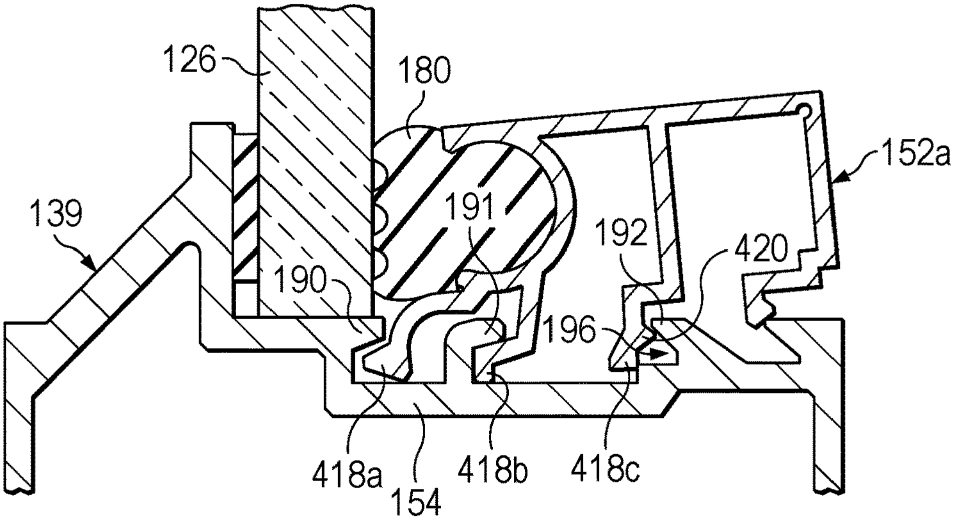
Figure 5C:
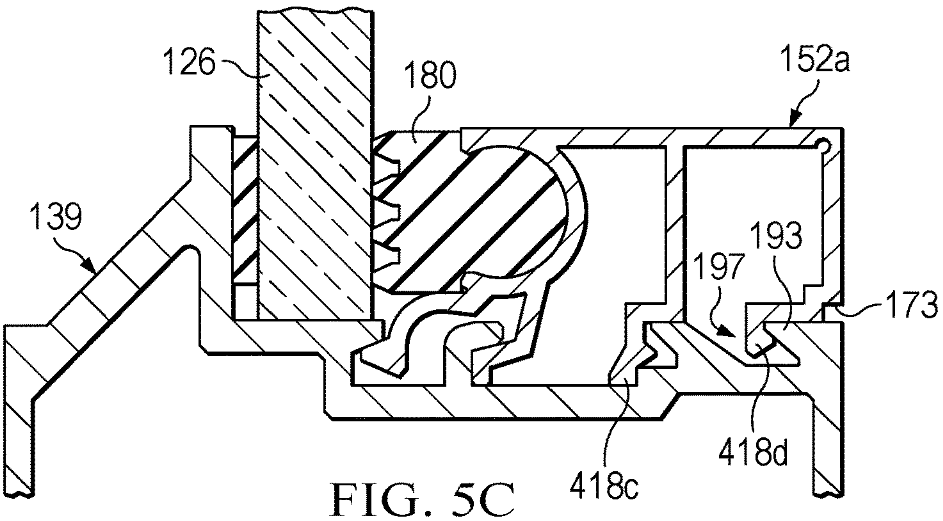

FIGS. 5A-5C illustrate various stages of installation of a retainer member 152*a* into a panel frame 139. As shown in FIG. 5A, the front two legs 412, 414 of the retainer member 152*a* may be inserted into corresponding channels 194 and 195 of the frame member 139. The rear side of the retainer member 152*a* may then be rotated toward the frame member 139 as the front two feet 418*a*, 418*b* are slid forward and lifted into contact with the corresponding protrusions 190, 191. Prior to the heel 420 contacting the protrusion 192 as shown in FIG. 5A, the retainer member 152*a* may be in the relaxed configuration. As the heel 420 contacts the protrusion 192, the protrusion pushes against the sloped surface on the bottom of the heel, urging the vertical member 404 and leg 410 forward. This forward movement may align the foot 418*c* for placement onto the shoulder 154. Once the heel 420 snaps into place into channel 196 and clears the protrusion 192, as shown in FIG. 5B, the foot 418*c* may be biased rearward against the vertical face separating the shoulder 154 from the horizontal member 155. As the heel 420 snaps into place, the sloped surface on the bottom of the foot 418*d* on the rear leg 408 may slide against the protrusion 193 and snap into place in channel 197 with the vertical member 406 biasing the foot 418*d* rearward. In this illustrated example, the heel 420 snaps into place first before the foot 418*d* engages the rear protrusion 193 and snaps into place below it. This two-stage snapping process may improve the ease of installation. In this installed configuration shown in FIG. 5C, the two intermediate legs 410, 412 may be squeezed closer together than in their relaxed configuration and may biased outward away from one another, aiding in retaining the retainer member 152*a* on the frame member 139.

As shown in FIG. 5C, the reveal 173 formed in the retainer member 152*a* provides a gap between the retainer member 152*a* and the frame member 139, allowing the retainer member 152*a* to be removed from the frame member 139 in a reverse order of FIGS. 5A-5C.

Figure 6A:
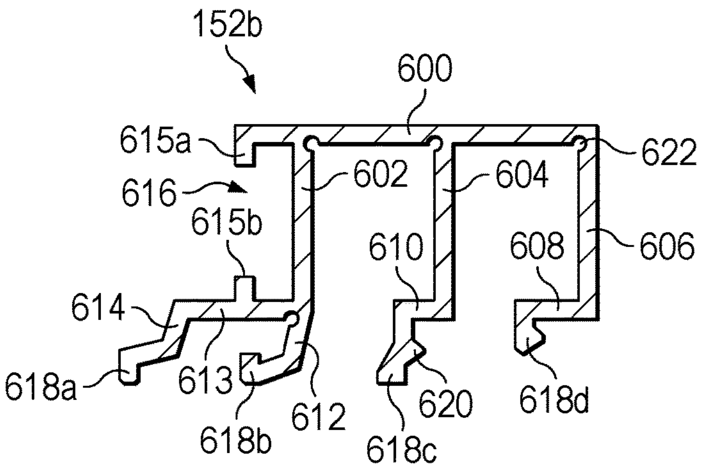
FIG. 6A is a cross-section view of a portion of an example of a retainer member in accordance with the present disclosure.

FIG. 6A illustrates another example of a retainer member 152*b* which may be similar to or the same as retainer members 152 shown in FIG. 3. The retainer member 152*b* includes a body member 600, which in some examples is horizontal when installed and the door is in the closed position. A front vertical member 602 extends from the body member 600 near a front side of the retainer member 152*b*. A rear vertical member 606 extends from the body member 600 near a rear side of the body member 600. An intermediate vertical member 604 extends from the body member 600 between the front and rear vertical members 602, 606. In the illustrated example, the body member 600 extends horizontally with a flat continuous surface on one side. The vertical members 602, 604, 606 are perpendicular to a flat surface on the other side of the body member 600. A seal protrusion 615*a* extends from the body member 600 in the same direction as the vertical members and forms a portion of a channel 616. A horizontal member 613 extends forward from the vertical member 602 and supports a front leg 614 with a rearward extending bend and supports a seal protrusion 615*b* forming another portion of the channel 616. The front leg 614 includes a first foot 618*a*. An intermediate leg 612 with a rearward extending bend forms a portion of the front vertical member 602 proximal of the front leg 614 and includes a second foot 618*b*. An intermediate leg 610 with a horizontal portion and a vertical portion forms a portion of the intermediate vertical member 604 and includes a third foot 618*c*. A heel 620 extends rearward from the intermediate leg 610. A rear leg 608 with a horizontal portion and a vertical portion forms a portion of the rear vertical member 606 and includes a fourth foot 618*d*. A plurality of notches 622 may be formed at various intersections to localize flexing of the retainer member 152*b* to desired regions.

It should be appreciated that the illustrated retainer member 152*b* is provided as an example of a retainer member 152 of FIG. 3 and any number of changes to the geometry of the retainer member 152*b* may be made without departing from the scope of this disclosure. For example, more or less vertical members, legs, feet, etc. could be provided, intersecting features could be oriented at different angles or curves instead of angles, the spacing between features could be altered, etc. It should be appreciated that features and functionalities of the retainer member 152*b* are similarly applicable to retainer members 152*a* and 152*c*-152*e*. For example, any of the retainer members 152 described herein may include a rectangular seal cavity 616, one or more notches 622, seal protrusions 615, etc.

Figure 6B:
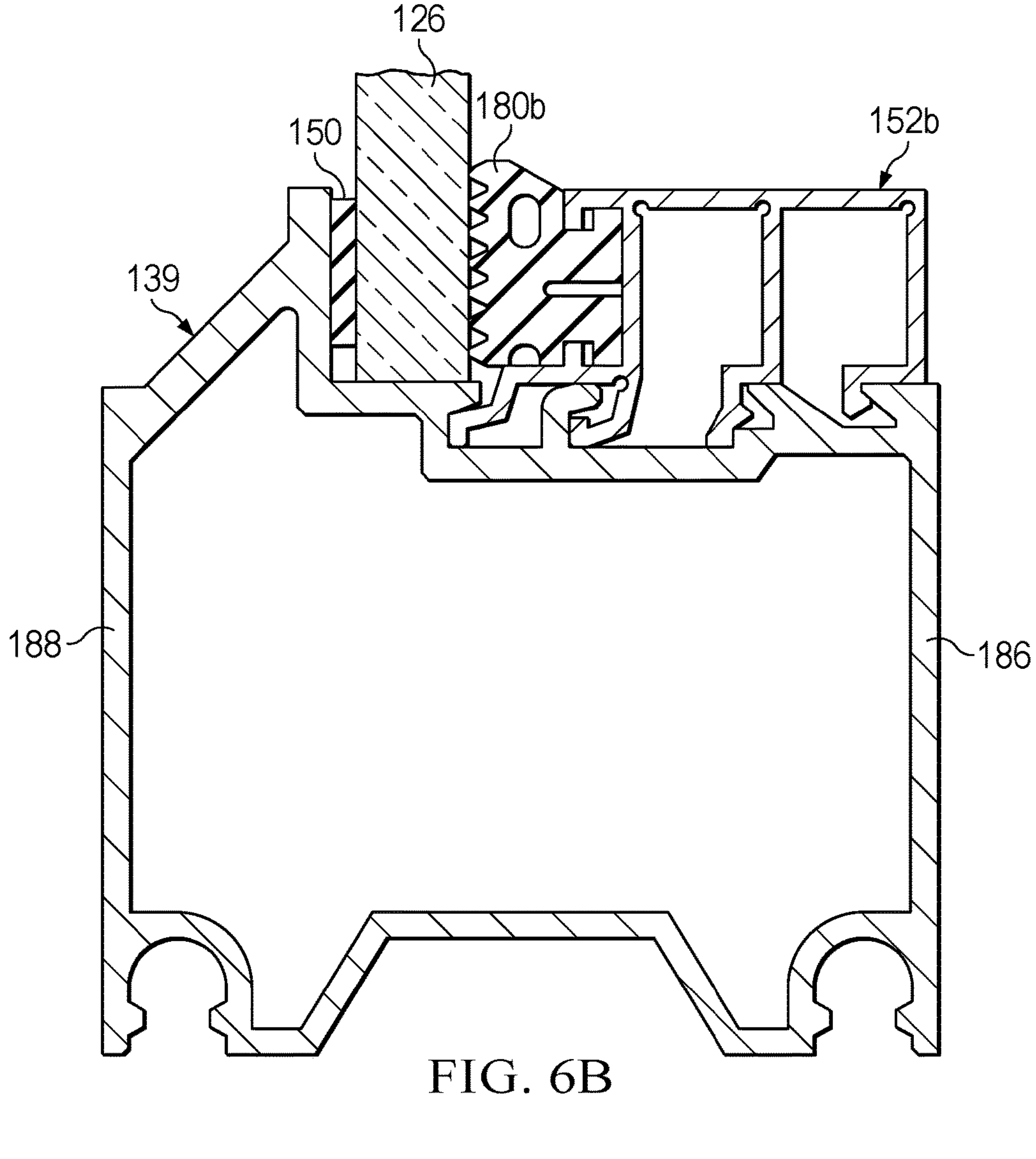
FIG. 6B is a cross section view of an assembly panel including the retainer member of FIG. 6A, taken along line A-A in FIG. 3.

FIG. 6B illustrates a cross-section through a lower frame member 136 of an assembled panel including the retainer member of FIG. 6A and the panel frame member of FIG. 4B, taken along line A-A shown in FIG. 3. When a retainer member 152*b* is installed, as shown in FIG. 6B, a seal 180*b* secured to the retainer member in the channel 616 may be in compression against the inner surface 130 of the glazing member 126, urging the glazing member 126 forward against the lip 170 and/or coupling mechanism 150, if present. In the installed configuration, the feet 618*a*-618*d* of the retainer member 152*b* are disposed in respective channels 194-197 of the frame member 139. One or more of the legs 608, 610, 612, 614 may be in a flexed configuration, biasing a respective foot 618*a*-618*d* into a respective channel 194-197. That is, the spacing between the feet 618*a*-618*d* in a relaxed configuration (uninstalled) of the retainer member 152*b* may be different than the spacing between the feet in the installed configuration due to the positioning and spacing of the of the protrusions 190-193. This biasing of the feet 618*a*-618*d* may help retain the feet in the corresponding channels 194-197.

Installation of the retainer member 152*b* and the functionality of the various components is similar to those of retainer member 152*a* above and need not be repeated.

Figure 7A:
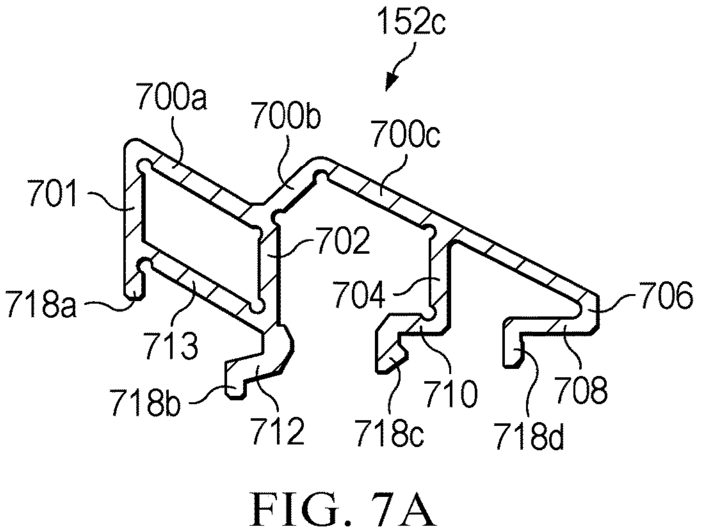
FIG. 7A is a cross-section view of a portion of an example of a retainer member in accordance with the present disclosure.

FIG. 7A illustrates another example of a retainer member 152*c* which may be similar to or the same as retainer members 152 shown in FIG. 3. The retainer member 152*c* includes a body member formed of three segments 700*a*-700*c* (collectively "body member 700") angled with respect to one another. A front vertical member 701 extends from a distal end of the body member segment 700*a* and a second vertical member 702 extends from a proximal end of the body member segment 700*a* and distal end of the body member segment 700*b*. A third vertical member 704 extends from a central portion of the body member segment 700*c* and a fourth vertical member 706 extends from the proximal end of the body member segment 700*c*. A horizontal member 713 extends between the front vertical member 701 and the second vertical member 702. A front foot 718*a* extends from the front vertical member 701. A leg 712 with a foot 718*b* extends from the second vertical member 702, a leg 710 with a foot 718*c* extends from the vertical member 704, and a leg 708 with a foot 718*d* extends from the vertical member 706.

It should be appreciated that the illustrated retainer member 152*c* is provided as an example of a retainer member 152 of FIG. 3 and any number of changes to the geometry of the retainer member 152*c* may be made without departing from the scope of this disclosure. For example, more or less vertical members, legs, feet, etc. could be provided, intersecting features could be oriented at different angles or curves instead of angles, the spacing between features could be altered, etc. It should be appreciated that features and functionalities of the retainer member 152*c* are similarly applicable to retainer members 152*a*-152*b* and 152*d*-152*e*. For example, any of the retainer members 152 described herein may include an angled body member, a deformable region, a vertical front foot 718*a* configured to contact the glazing member, etc.

Figure 7B:
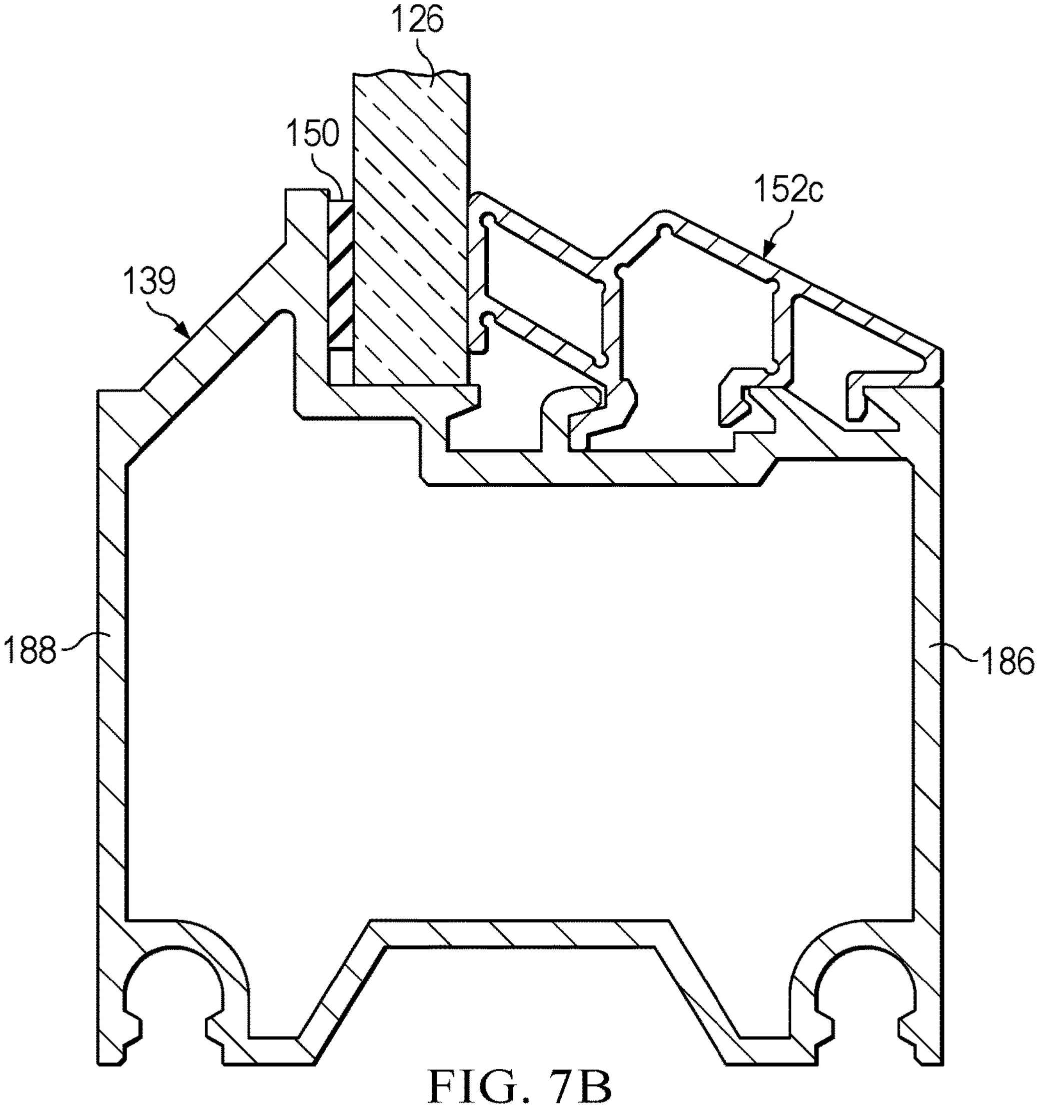
FIG. 7B is a cross section view of an assembly panel including the retainer member of FIG. 7A, taken along line A-A in FIG. 3.

FIG. 7B illustrates a cross-section through a lower frame member 136 of an assembled panel including the retainer member of FIG. 7A and the panel frame member of FIG. 4B, taken along line A-A shown in FIG. 3. When a retainer member 152*c* is installed, as shown in FIG. 7B, the front vertical member 701 and front foot 718*a* may be vertical, resting against the inner surface of the glazing member 126, with or without a seal therebetween. The feet 718*b*-718*d* of the retainer member 152*c* are disposed in respective channels 194-197 of the frame member 139. One or more of the legs 708, 710, 712 may be in a flexed configuration, biasing a respective foot 718*b*-718*d* into a respective channel 195-197. That is, the spacing between the feet 718*b*-718*d* in a relaxed configuration (uninstalled) of the retainer member 152*c* may be different than the spacing between the feet in the installed configuration due to the positioning and spacing of the of the protrusions 191-193. This biasing of the feet 718*b*-718*d* may help retain the feet in the corresponding channels 195-197.

The V-shaped intersections of the body member segments 700*a*-700*c* may act as a deformation region in the body member 700 configured to collapse and absorb impact energy. The horizontal member 713 may help retain the front vertical member 701 in a vertical position against the glazing member 126 during deformation of the retainer member 152*c*.

Installation of the retainer member 152*c* and the functionality of the various components is similar to those of retainer member 152*a* above and need not be repeated.

Figure 8A:
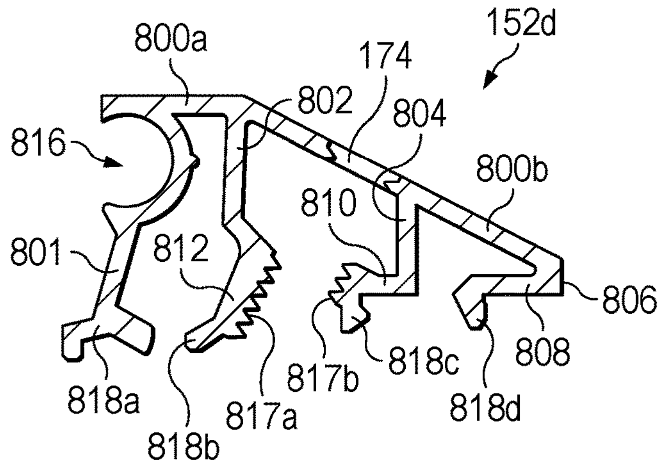
FIG. 8A is a cross-section view of a portion of an example of a retainer member in accordance with the present disclosure.

FIG. 8A illustrates another example of a retainer member 152*d* which may be similar to or the same as retainer members 152 shown in FIG. 3. The retainer member 152*d* includes a body member formed of two segments 800*a*, 800*b* (collectively "body member 800") angled with respect to one another. A front vertical member 801 extends from the body member segment 800*a*, and a second vertical member 802 extends from a proximal end of the body member segment 800*a* and distal end of the body member segment 800*b*, a third vertical member 804 extends from a central portion of the body member segment 800*b* and a fourth vertical member 806 extends from the proximal end of the body member segment 800*b*. The front vertical member 801 includes a curved channel 816 configured to receive and retain a seal. A front foot 818*a* of the vertical member 801 is bifurcated with a forward extension and a rear extension. A leg 812 with a foot 818*b* extends from the second vertical member 802, a leg 810 with a foot 818*c* extends from the vertical member 804, and a leg 808 with a foot 818*d* extends from the vertical member 806.

It should be appreciated that the illustrated retainer member 152*d* is provided as an example of a retainer member 152 of FIG. 3 and any number of changes to the geometry of the retainer member 152*d* may be made without departing from the scope of this disclosure. For example, more or less vertical members, legs, feet, etc. could be provided, intersecting features could be oriented at different angles or curves instead of angles, the spacing between features could be altered, etc. It should be appreciated that features and functionalities of the retainer member 152*d* are similarly applicable to retainer members 152*a*-152*c* and 152*e*. For example, any of the retainer members 152 described herein may include a bifurcated front foot 818*a*, a cylindrical seal cavity 816, sets of teeth 817*a*-817*b*, etc.

Figure 8B:
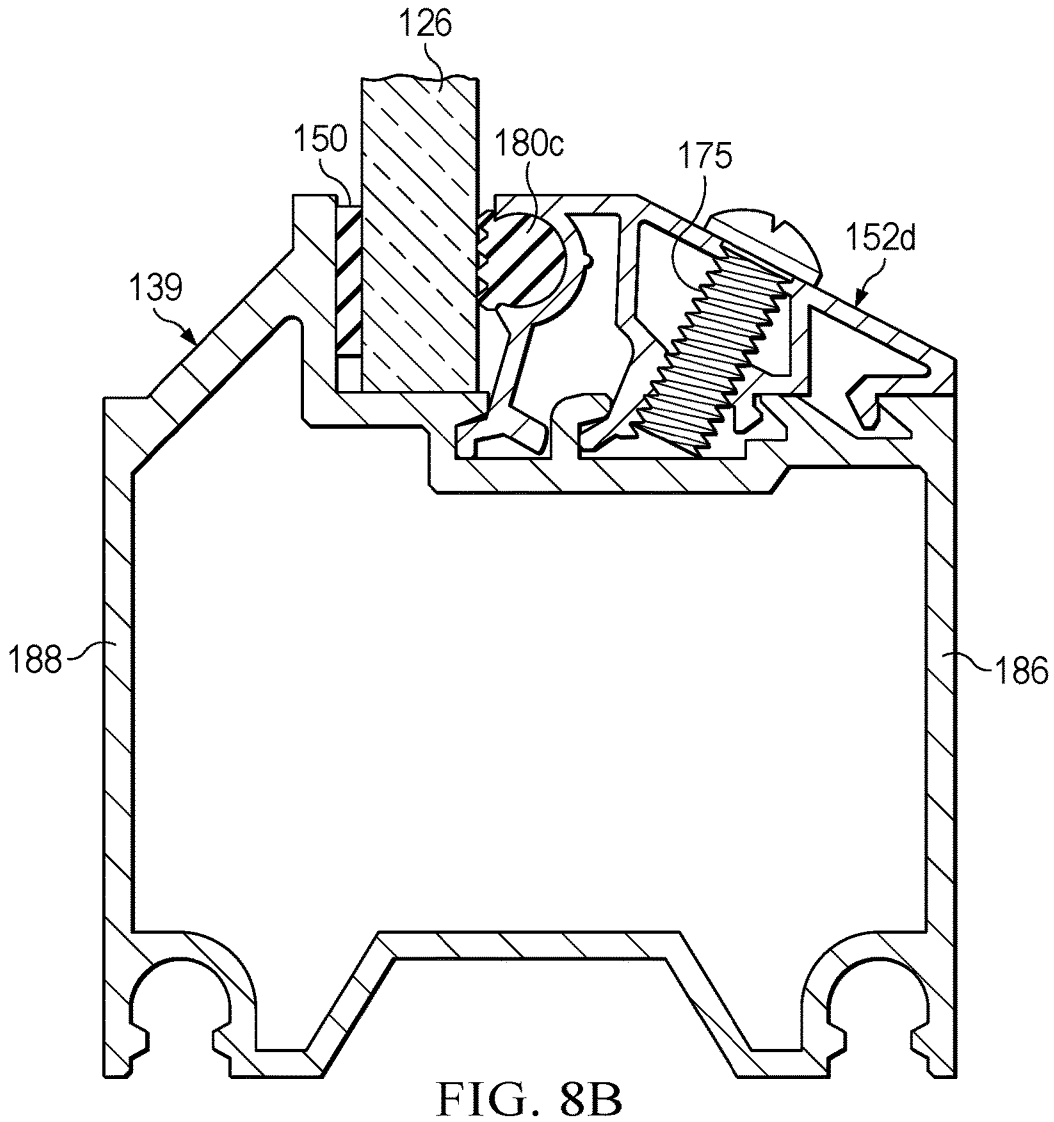
FIG. 8B is a cross section view of an assembly panel including the retainer member of FIG. 8A, taken along line A-A in FIG. 3.

FIG. 8B illustrates a cross-section through a lower frame member 136 of an assembled panel including the retainer member of FIG. 8A and the panel frame member of FIG. 4B, taken along line A-A shown in FIG. 3. When a retainer member 152*d* is installed, as shown in FIG. 8B, a seal 180*c* secured to the retainer member in the channel 816 may be in compression against the inner surface 130 of the glazing member 126, urging the glazing member 126 forward against the lip 170 and/or coupling mechanism 150, if present. In the installed configuration, the feet 818*a*-818*d* of the retainer member 152*d* are disposed in respective channels 194-197 of the frame member 139. One or more of the legs or vertical members may be in a flexed configuration, biasing a respective foot 818*a*-818*d* into a respective channel 194-197. That is, the spacing between the feet 818*a*-818*d* in a relaxed configuration (uninstalled) of the retainer member 152*d* may be different than the spacing between the feet in the installed configuration due to the positioning and spacing of the of the protrusions 190-193. This biasing of the feet 818*a*-818*d* may help retain the feet in the corresponding channels 194-197. Further, the bifurcation of the foot 818*a* may provide additional retention of the retainer member 152*d* to the frame member 139. That is, not only will the foot 818*a* contact the protrusion 190 and resist rotation of the retainer member 152*d*, but the rear side of the foot 818*a* will contact the protrusion 191 and resist rearward translation of the retainer member 152*d* as well as prevent the foot 818*a* from retracting from the channel 194.

In some examples, one or more fasteners 175 may be installed to provide additional retention of the retainer member 152*d* on the frame member 139. With reference to FIG. 8A, a rear side of the leg 812 has a first set of teeth 817*a* and a front side of the leg 810 has a corresponding second set of teeth 817*b*. The teeth on these two legs are sized and shaped as threads to engage corresponding teeth on a fastener 175. In some examples, an aperture 174 through the body member 800*b* may be pre-drilled and may be threaded. In some examples, a fastener 175 may be self-tapping and may create the aperture 174 as it is installed. The body member segment 800*b* may include a notch along its outer side configured to align a self-tapping fastener 175 with the sets of teeth 817*a*, 817*b*. In some examples, a fastener 175 may have a length such that a tip of the fastener is disposed above the shoulder of the frame member 139 when fully installed. In some examples, a fastener 175 may have a length such a tip of the fastener penetrates the frame member 139 when fully installed. The fasteners 174 help keep the retainer member 152*d* secured to the frame member and the glazing member 126 secured in the panel. In this regard, a fastener 175 may secure the retainer member 152*d* to the frame member 139 directly (e.g., the fastener extends through and is threaded to both the retainer member and the frame member) and/or indirectly (e.g., the fastener may push the legs 810, 812 apart to push the respective feet 818*c*, 818*b* into channels 195, 196. It should be appreciated that any of the retainer members 152 described herein may be similarly configured to receive one or more fasteners 175.

Installation of the retainer member 152*d* and the functionality of the various components is similar to those of retainer member 152*a* above and need not be repeated.

Figure 9A:
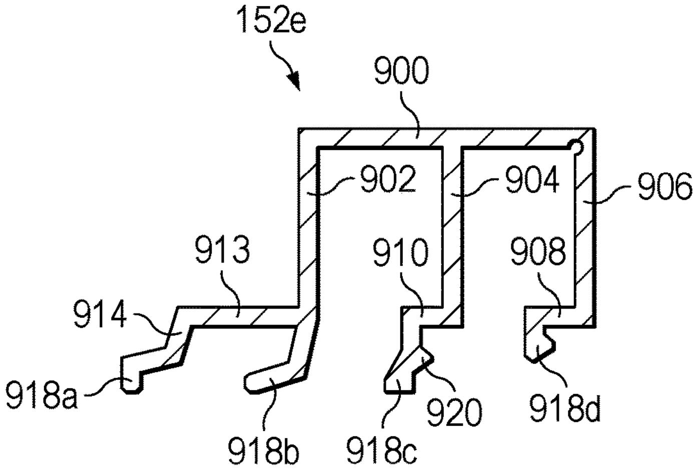
FIG. 9A is a cross-section view of a portion of an example of a retainer member in accordance with the present disclosure.

FIG. 9A illustrates another example of a retainer member 152*e* which may be similar to or the same as retainer members 152 shown in FIG. 3. The retainer member 152*e* includes a body member 900, which in some examples is horizontal when installed and the door is in the closed position. A front vertical member 902 extends from the body member 900 near a front side of the retainer member 152*e*. A rear vertical member 906 extends from the body member 900 near a rear side of the body member 900. An intermediate vertical member 904 extends from the body member 900 between the front and rear vertical members 902, 906. In the illustrated example, the body member 900 extends horizontally with a flat continuous surface on one side. The vertical members 902, 904, 906 are perpendicular to a flat surface on the other side of the body member 900. A horizontal member 913 extends forward from the vertical member 902 and supports a front leg 914 with a rearward extending bend. The front leg 914 includes a first foot 918*a*. An intermediate leg 912 with a rearward extending bend forms a portion of the front vertical member 902 proximal of the front leg 914 and includes a second foot 918*b*. An intermediate leg 910 with a horizontal portion and a vertical portion forms a portion of the intermediate vertical member 904 and includes a third foot 918*c*. A 920 extends rearward from the intermediate leg 910. A rear leg 908 with a horizontal portion and a vertical portion forms a portion of the rear vertical member 906 and includes a fourth foot 918*d*.

It should be appreciated that the illustrated retainer member 152*e* is provided as an example of a retainer member 152 of FIG. 3 and any number of changes to the geometry of the retainer member 152*e* may be made without departing from the scope of this disclosure. For example, more or less vertical members, legs, feet, etc. could be provided, intersecting features could be oriented at different angles or curves instead of angles, the spacing between features could be altered, etc. It should be appreciated that features and functionalities of the retainer member 152*e* are similarly applicable to retainer members 152*a*-152*d*. For example, any of the retainer members 152 described herein may include a horizontal member 913 supporting a front leg, etc.

Figure 9B:
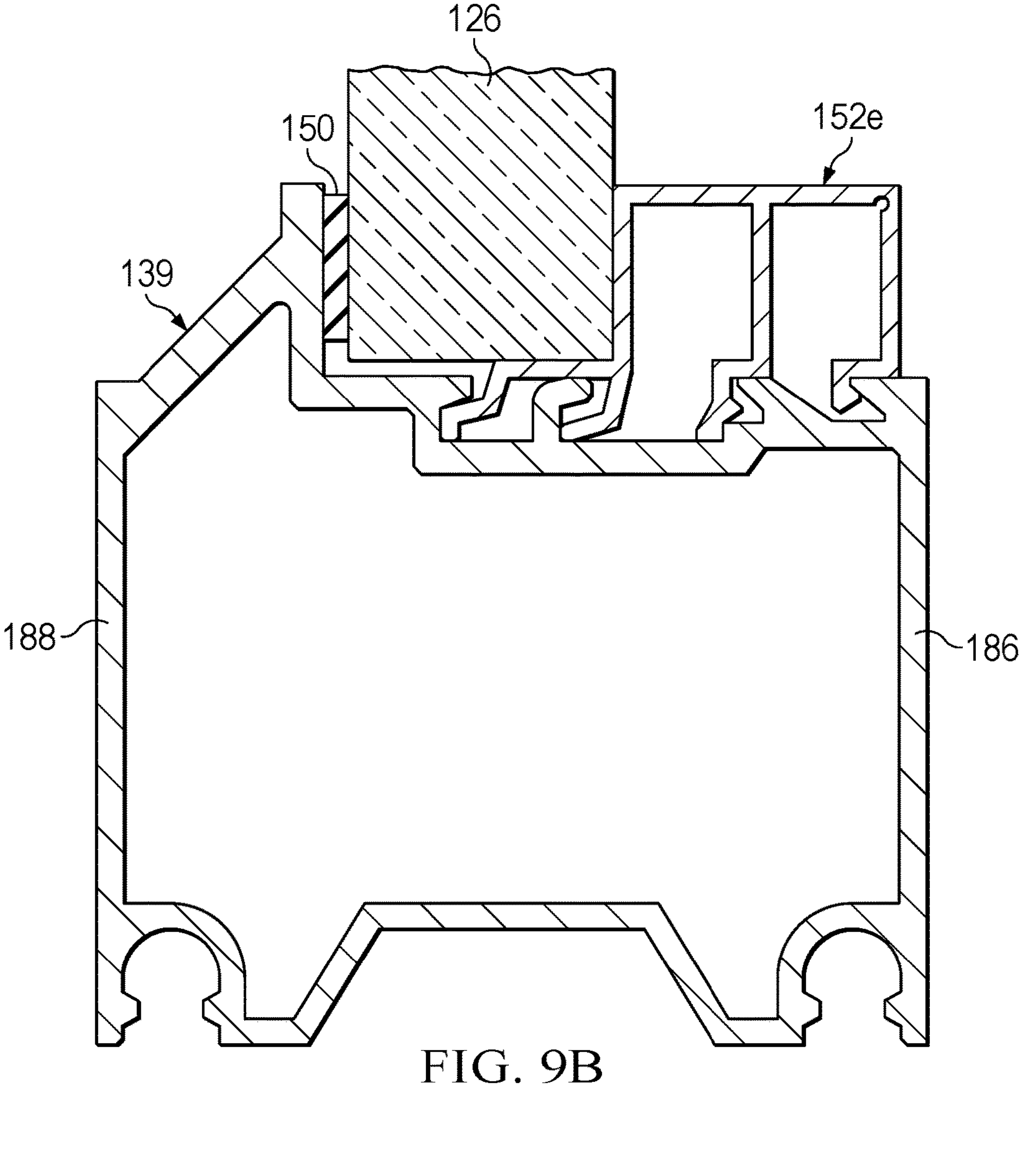
FIG. 9B is a cross section view of an assembly panel including the retainer member of FIG. 9A, taken along line A-A in FIG. 3.

FIG. 9B illustrates a cross-section through a lower frame member 136 of an assembled panel including the retainer member of FIG. 9A and the panel frame member of FIG. 4B, taken along line A-A shown in FIG. 3. In this example, the glazing member 126 has an increased thickness compared to the other illustrated examples and the retainer member 152*e* may be particularly suited for accommodating the larger glazing member 126. When a retainer member 152*e* is installed, as shown in FIG. 9B, the outer perimeter of the glazing member 126 may rest on the horizontal member 913 of the retainer member 152*e*, rather than on the ledge 132 of the frame member 139. In the installed configuration, the feet 918*a*-918*d* of the retainer member 152*e* are disposed in respective channels 194-197 of the frame member 139. One or more of the legs 908, 910, 912, 914 may be in a flexed configuration, biasing a respective foot 918*a*-918*d* into a respective channel 194-197. That is, the spacing between the feet 918*a*-918*d* in a relaxed configuration (uninstalled) of the retainer member 152*e* may be different than the spacing between the feet in the installed configuration due to the positioning and spacing of the of the protrusions 190-193. This biasing of the feet 918*a*-918*d* may help retain the feet in the corresponding channels 194-197.

Installation of the retainer member 152*e* and the functionality of the various components is similar to those of retainer member 152*a* above and need not be repeated. However, due to the increased thickness of the glazing member 126 in FIG. 9B, the glazing member 126 may first be mated with the one or more retainer members 152*e* and the retainer member(s) 152*e* and glazing member 126 may be installed into the opening 172 of the panel frame together as unit.

It is contemplated that the retainer members 152 described herein may interact with a frame member 139 and glazing member 126 to satisfy some levels of the impact rating without the need for additional fasteners. However, to improve securement of the glazing member within a panel, one or more fasteners (not shown) may be used to secure the retainers members 152 to the frame members 139. The fasteners may be positioned through apertures formed within a top or rear side of the retainer members and may extend into the frame members. The fasteners may be inserted into a retainer member at an angle of approximately 30 degrees relative to the shoulder 154. Examples of fasteners securing a retainer member to a panel frame are provided in U.S. Pat. Pub. No. 2017/0247937, entitled “IMPACT RESISTANT FULL VIEW DOOR,” which is incorporated by reference herein in its entirety.

Although the examples herein are described primarily in the context of a multi-panel upward-acting sectional door, it will be appreciated that the concepts of the present disclosure may be applied to single-panel doors, sliding doors, windows, and the like.

Although the figures show relative positions of each component, the actual dimension and scale of each component may differ from the illustration and depend on particular production specifications.

In the foregoing description of certain examples, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. In the foregoing description of certain examples, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as “outer” and “inner,” “upper” and “lower,” “first” and “second,” “internal” and “external,” “above” and “below” and the like are used as words of convenience to provide reference points and are not to be construed as limiting terms.

In addition, the foregoing describes only some examples of the concepts of the present disclosure, and alterations, modifications, additions and/or changes can be made thereto without departing from the scope and spirit of the disclosure, the examples being illustrative and not restrictive.

Also, the various examples described above may be implemented in conjunction with other examples, e.g., aspects of one example may be combined with aspects of another example to realize yet other examples. Further, each independent feature, component, or process of any given system or method may constitute an additional example.

Persons of ordinary skill in the art will appreciate that the implementations encompassed by the present disclosure are not limited to the particular example implementations described above. In that regard, although illustrative examples have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A door, comprising:
- a plurality of door panels hingedly connected, at least one of the plurality of door panels comprising:
  - a frame defining an opening and including a lip extending into the opening;
  - a glazing member, a front side of the glazing member disposed adjacent the lip; and
  - a retainer member disposed adjacent a rear side of the glazing member, the retainer member comprising:
    - a body member;
    - a first leg;
    - a second leg;
    - a third leg; and
    - a fourth leg;
    - wherein at least three of the first, second, third, and fourth legs are configured for receipt into corresponding channels in the frame to secure the retainer member to the frame.

2. The door of claim 1, wherein a portion of the second leg extends forward into a first channel in the frame and a portion of the third leg extends rearward into a second channel in the frame.

3. The door of claim 2, wherein a portion of the fourth leg extends rearward into a third channel in the frame.

4. The door of claim 1, further comprising an adhesive member disposed between the lip of the frame and the front side of the glazing member.

5. The door of claim 1, wherein the frame is formed of aluminum extrusions.

6. The door of claim 1, wherein the frame and retainer member are configured such that, when a horizontal force is applied to the front side of the glazing member, the second leg is prevented from lifting away from the frame by a ridge of the frame extending above the second leg and at least one of the third leg or the fourth leg is prevented from translating rearward by engagement with corresponding protrusions on the frame.

7. The door of claim 2, wherein the first leg extends substantially vertically and is configured to contact the rear side of the glazing member.

8. The door of claim 1, wherein a portion of each of the first and second legs extends forward into corresponding first and second channels in the frame and a portion of each of the third and fourth legs extends rearward into corresponding third and fourth channels in the frame.

9. The door of claim 1, wherein the frame further comprises a ledge substantially perpendicular to the lip, an outer perimeter of the glazing member configured to contact the ledge.

10. The door of claim 1, further comprising a resilient seal member disposed between the retainer member and the rear side of the glazing member.

11. A retainer member configured to retain a glazing member in a door or window, comprising:
- a body member;
- a first leg;
- a second leg configured to engage a first mating feature of a frame of the door or window;
- a third leg configured to engage a second mating feature of the frame; and
- a fourth leg configured to engage a third mating feature of the frame;
- wherein each of the second, third, and fourth legs are configured to flex with respect to the body member.

12. The retainer member of claim 11, wherein a front side of each of the first leg and the second leg is configured to engage the frame and a rear side of each of the third leg and the fourth leg is configured to engage the frame.

13. The retainer member of claim 12, further comprising:
- a first vertical member from which the first and second legs extend;
- a second vertical member from which the third leg extends; and
- a third vertical member from which the fourth leg extends, each of the first, second, and third vertical members extending from the body member.

14. The retainer member of claim 13, wherein at least a portion of the first vertical member is cylindrical forming a cavity configured to retain a seal member.

15. The retainer member of claim 13, further comprising a horizontal member extending between the first leg and the second leg.

16. The retainer member of claim 15, wherein a portion of the body member and a portion of the horizontal member form a cavity configured to retain a seal member.

17. The retainer member of claim 15, wherein the first vertical member and the horizontal member form an L-shaped recess configured to receive an edge of a glazing member.

18. The retainer member of claim 11, further comprising:
- a first vertical member from which the first leg extends;
- a second vertical member from which the second leg extends;
- a third vertical member from which the third leg extends; and
- a fourth vertical member from which the fourth leg extends, each of the first, second, third, and fourth vertical members extending from the body member.

19. The retainer member of claim 18, wherein the fourth vertical member is shorter than the second vertical member and a portion of the body member is angled away from the first, second, third, and fourth legs between the fourth leg and the second leg.

20. The retainer member of claim 18, further comprising a horizontal member extending between the first and second vertical members.

21. The retainer member of claim 20, wherein the body member comprises a deformation region configured to collapse and absorb impact energy.

22. The retainer member of claim 18, wherein the second leg comprises a first set of teeth and the third leg comprises a second set of teeth, the first and second sets of teeth configured to receive corresponding threads of a fastener.

23. The retainer member of claim 11, further comprising a reveal formed across a rear side of the retainer member.

* * * * *